United States Patent [19]

Wagner, Jr.

[11] Patent Number: 4,494,754
[45] Date of Patent: Jan. 22, 1985

[54] APPARATUS FOR PLAYING HOME VIDEO GAMES

[76] Inventor: John R. Wagner, Jr., 300 Ashley Dr., Rochester, N.Y. 14620

[21] Appl. No.: 429,604

[22] Filed: Sep. 30, 1982

[51] Int. Cl.³ ............................................. A63B 71/00
[52] U.S. Cl. .................................. 273/148 B; 108/43; 248/346; 248/176
[58] Field of Search ................... 273/148 R, 309, 287; 108/25, 43; 248/310, 346, 176

[56] References Cited

U.S. PATENT DOCUMENTS

| | | | |
|---|---|---|---|
| 687,482 | 11/1901 | Lenderson | 297/250 X |
| 1,501,005 | 7/1924 | Larsen | 297/250 |
| 2,697,018 | 12/1954 | Georgides . | |
| 2,979,990 | 4/1961 | Alexander . | |
| 3,361,091 | 1/1968 | Inman . | |
| 3,750,312 | 8/1973 | Bucher . | |
| 3,784,139 | 1/1974 | Ellis | 248/310 X |
| 3,906,648 | 9/1975 | Bard . | |
| 4,078,757 | 3/1978 | Waters . | |
| 4,133,466 | 1/1979 | Rosen | 248/310 X |
| 4,292,748 | 10/1981 | Miller . | |
| 4,422,640 | 12/1983 | Tamarkin | 273/148 R |

FOREIGN PATENT DOCUMENTS 812680  7/1949  Fed. Rep. of Germany ........ 108/43

OTHER PUBLICATIONS

"Compute!" Magazine, Jan. 1983, pp. 203, 224, Advertisement.

Primary Examiner—William H. Grieb
Assistant Examiner—Scott L. Brown
Attorney, Agent, or Firm—Woodard, Weikart, Emhardt & Naughton

[57] ABSTRACT

A video game accessory and method for playing video games which frees one hand and simplifies the operation of the game controller. A player sits on a chair over a base which is resting on the chair. A riser extends from the base between the player's legs and supports a mounting member which is positioned over the player's lap, and which holds a video game controller in place. A player thus positioned plays video games with both hands free to operate the game controls.

8 Claims, 6 Drawing Figures

APPARATUS FOR PLAYING HOME VIDEO GAMES

BACKGROUND OF THE INVENTION

1. Field of the Invention

Generally, the field of the invention is accessories for, and methods of playing, home video games.

2. Description of the Prior Art

Home video gaming is enjoying an unprecedented popularity in our society. In such games, microcomputers manipulate images on a television screen in response to control commands made by game player(s). Such commands may be made either by keyboard entries, or more typically, by hand manipulation of a game controller. Game controllers take a variety of forms, but usually include at least a button and either a dial or a joy stick. Virtually all controllers require the use of both hands, one to hold the controller and one to operate the controls. Using a controller for an extended period of time is especially tiring for the hand which is holding the controller. This hand tends to get sore and/or stiff as it is used to grip the controller during play. Players often worsen the problem when they more tightly grip the controller during particularly tense games. Also, most controllers are attached to the central unit of the computer system by a cord. This fact is often forgotten by players who get involved in the video game they are playing. This understandable forgetfulness sometimes results in the cord being accidently pulled from its socket, having the tendency to cause damage to the controller, the central unit, and other objects nearby.

SUMMARY OF THE INVENTION

The invention generally relates to a unique holder for video game controllers which frees one hand and simplifies the operation of the game controller, and to methods for playing video games. In one embodiment, a player sits on a chair over a base which is resting on the chair. A riser extends from the base between the player's legs and supports a mounting member which is positioned over the player's lap. The mounting member includes means for holding a video game controller in place. A player thus positioned can play a video game with both hands free to operate the game controls.

It is an object of the present invention to make use of video game controllers easier and more enjoyable. It is a further object to reduce strain caused by extended use of such controllers. It is yet another object to provide for the accommodation of more sophisticated home video game controls. It is yet another object to reduce the risk of accidental damage during play caused by the inadvertent pulling of the controller cord from the central unit. These, as well as other objects and advantages of the present invention will become evident from a reading of the following description and through use of the present invention as described in the claims.

DESCRIPTION OF THE PREFERRED EMBODIMENT

Figure 1:
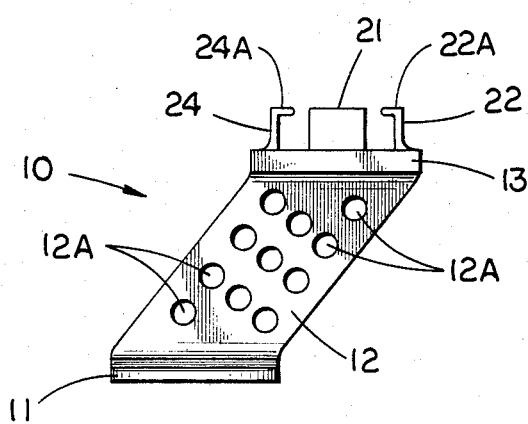
FIG. 1 is a side elevational view of a video game controller holder of the present invention.
Figure 2:
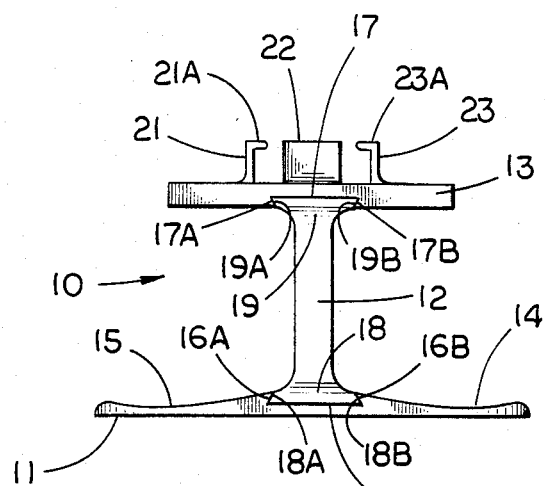
FIG. 2 is a front elevational view of the video game controller holder of FIG. 1.
Figure 3:
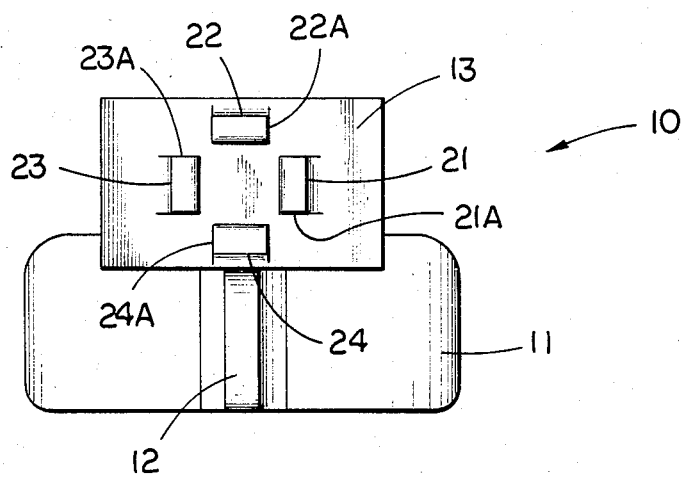
FIG. 3 is a top plan view of the video game controller holder of FIGS. 1 and 2.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings, video game controller holder 10 includes generally base 11, riser 12, mounting member 13 and controller holders 21-24. Base 11 extends horizontally and includes a top which has curved seat surfaces 14 and 15 that are suitably curved to conform to a person sitting with the persons upper, rear leg portions (posterior of the thighs) resting on surfaces 14 and 15. Base 11 also defines inwardly expanding channel 16 extending between curved surfaces 14 and 15. Base 11 has a flat bottom which is suitable for positioning on substantially flat surfaces, such as a floor or a chair.

Attached to platform member 13 are controller holders 21-24. Controller holders 21-24 each rise vertically from platform member 13 and each include inwardly extending flanges 21A-24A respectively. Controller holders 21-24 are made of flexible, resilient plastic and are bendable away from each other to allow a video game controller 40 to be positioned within the controllers and locked into place by flanges 21A-24A. Platform member 13 also includes inwardly expanding channel 17.

Riser 12 is generally I-shaped in cross section and extends upward and forward (in relation to a player using holder 10) from said base. Riser 12 includes an outwardly expanding rail 18 which coactingly fits into inwardly extending channel 16 of base 11. Likewise, riser 12 includes outwardly expanding rail 19 which coactingly fits into inwardly expanding channel 17 of platform member 13. When holder 10 is assembled, friction forces between surfaces 16A and 18A, 16B and 18B, 17A and 19A, and 17B and 19B holds riser 12 in place in relation to base 11 and to platform member 13. Riser 12 may also be held in place by detents or other suitable means. Holes in riser 12 are incorporated for structural purposes.

There are a number of available plastic materials which may be injection molded and which would provide satisfactory strength and durability for controller holder 10. Polypropylene is one possible material for construction. Also, ABS or polystyrene may be used. Another plastic material which would provide superior strength at added cost is polycarbonate. Of course, the present invention need not be made in plastic. Other types of construction, such as wood or metal, may also be attractive and practical as well.

Figure 4:
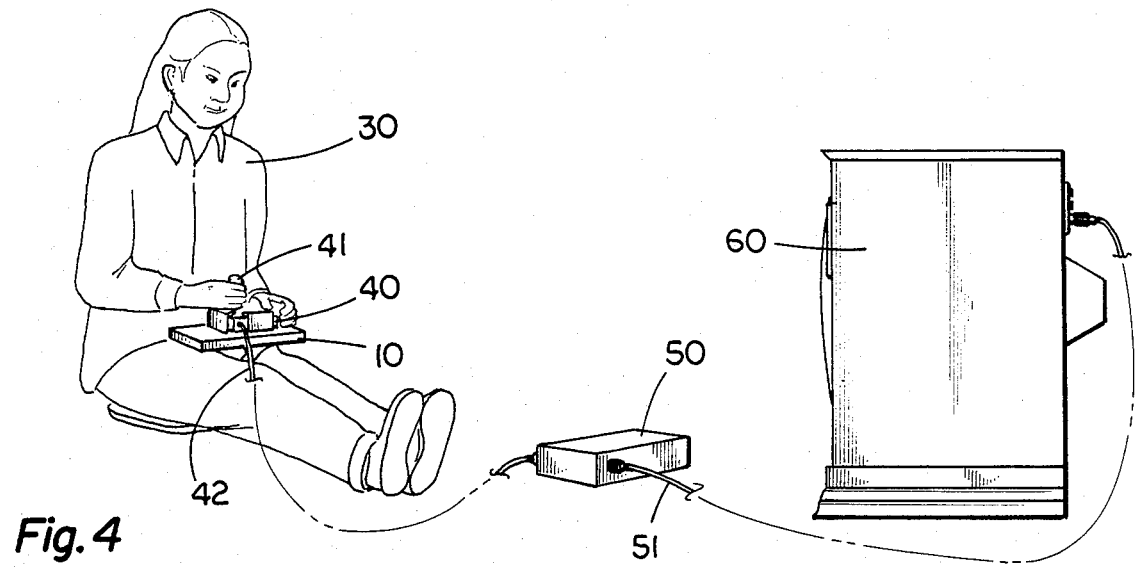
FIG. 4 is a perspective view of a video game player operating a video game controller mounted on the video game controller holder of FIGS. 1-3.
Figure 5:
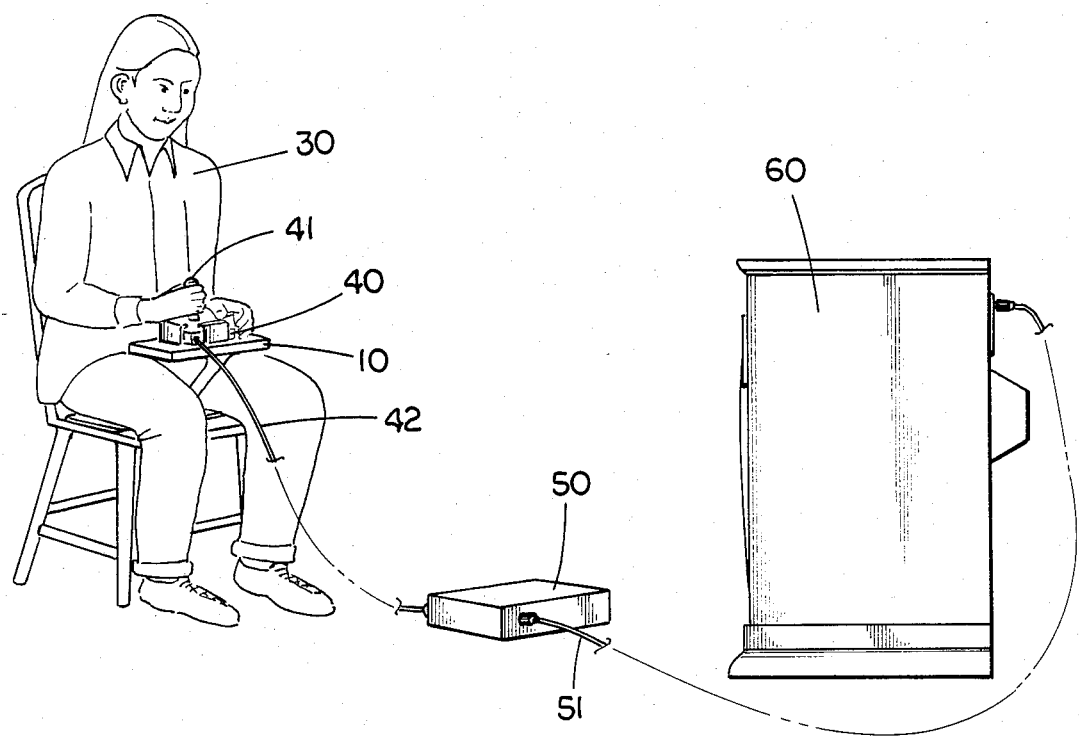
FIG. 5 is a perspective view of a video game player in a sitting position operating a video game controller mounted on a video game controller holder of FIGS. 1-3.
Figure 6:
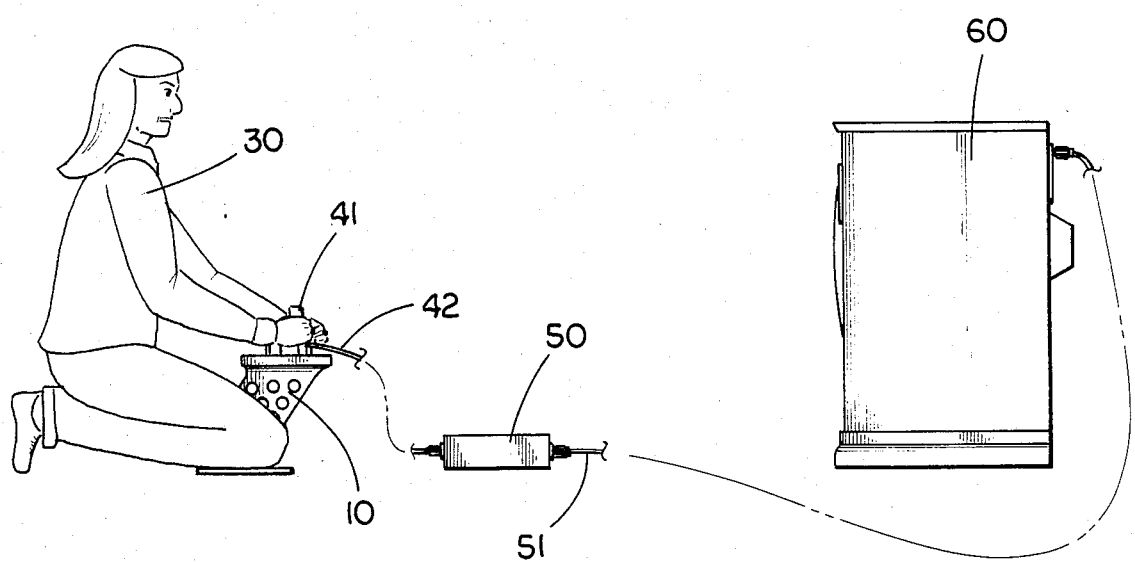
FIG. 6 is a perspective view of a video game player in a kneeling position operating a video game controller mounted on a video game controller holder of FIGS. 1-3.

In practicing the method of the invention, video game player 30 operates the controls (for instance joy stick 41) of video game controller 40. Video game controller 40 is fixedly mounted on video game controller holder 10, as described above, and is connected to video microprocessor 50 through wire 42. Microprocessor 50 manipulates images on television screen 60 through line 51 in response to the control commands made by video game player 30. Play 30 gives stability to controller holder 10 and to video game controller 40 positioned thereon by placing lower body weight on seat portions 14 and 15, with riser 12 extending between the legs of player 30. In one embodiment, this stabilizing is accomplished by video game player 30 sitting on a floor with player's rear upper leg portions being positioned over, and resting on seat portions 14 and 15 as illustrated in FIG. 4. In another embodiment, player 30 sits on a chair with the rear, upper leg portions of player 30 being positioned on seat portions 14 and 15, as illustrated in FIG. 5. In yet another embodiment, player 30 places lower body weight on video controller holder 10 by kneeling on seat portions 14 and 15 of video game controller as illustrated in FIG. 6.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An accessory for aiding a video game player during play of a video game, the video game player operating a video game controller which transmits signals in response to manipulations made on the video game controller by the video game player, the transmitted signals being processed by a computer processor which responsively manipulates images on a television screen, said accessory comprising: a base, said base extending horizontally, said base being positionable on a surface so as to permit a video game player to stabilize said base by placing lower body weight on said base; a riser, said riser extending upward from said base; and a mounting member attached to said riser, said mounting member being positioned over the lap of a player with lower body weight on said base, said mounting member including means for lockably receiving a video game controller in fixed position on said mounting member.

2. The video game accessory of claim 1 in which said base has a substantially flat bottom and a top which is curved to conform to the rear, upper leg portions of a video game player.

3. The video game accessory of claim 1 in which said riser extends between the legs of a player with lower body weight on said base.

4. The video game accessory of claim 1 in which said controller receiving means includes at least one resilient member, said resilient member being forceable to a position which allows said receiving means to receive a video game controller, upon release of pressure on said resilient member, said resilient member resiliently returning to lock the video game controller in place.

5. An accessory for aiding a video game player during play of a video game, the video game player operating a video game controller which transmits signals in response to manipulations made on the video game controller by the video game player, the transmitted signals being processed by a computer processor which responsively manipulates images on a television screen, said accessory comprising: a base, said base having a substantially flat bottom and a top which is curved to conform to the rear, upper leg portions of a video game player, said base being positionable on a chair so as to permit a video game player to stabilize said base by sitting with the player's rear, upper legs positioned on said curved base top; a riser, said riser extending upward from said base; and a mounting member attached to said riser and extending horizontally therefrom, said mounting member including means for lockably receiving a video game controller in fixed position on said mounting member.

6. The video game accessory of claim 5 in which said riser extends forwardly from said base between the legs of a player with rear upper legs positioned on said base.

7. The video game accessory of claim 6 in which said controller receiving means includes at least one resilient member, said resilient member being forceable to a position which allows said receiving means to receive a video game controller, upon release of pressure on said resilient member, said resilient member resiliently returning to lock the video game controller in place.

8. The video game accessory of claim 5 in which said controller receiving means includes at least one resilient member, said resilient member being forceable to a position which allows said receiving means to receive a video game controller, upon release of pressure on said resilient member, said resilient member resiliently returning to lock the video game controller in place.

* * * * *